(12) United States Patent
Hoshi

(10) Patent No.: US 6,832,193 B1
(45) Date of Patent: Dec. 14, 2004

(54) SOUND SPECIAL REPRODUCING METHOD AND INFORMATION REPRODUCING APPARATUS

(75) Inventor: Kazuo Hoshi, Tokyo (JP)

(73) Assignee: LG Electronics Inc., Seoul (KR)

( * ) Notice: Subject to any disclaimer, the term of this patent is extended or adjusted under 35 U.S.C. 154(b) by 242 days.

(21) Appl. No.: 09/615,313

(22) Filed: Jul. 13, 2000

(30) Foreign Application Priority Data

Jul. 13, 1999 (JP) .......................... 11-198485

(51) Int. Cl.7 .................. G10L 21/00; G10L 15/26; H04N 5/91
(52) U.S. Cl. .................. 704/270; 704/235; 386/68
(58) Field of Search .................. 704/235, 270, 704/271, 276, 278, 503, 200.1; 386/68, 75

(56) References Cited

U.S. PATENT DOCUMENTS 5,938,447 A * 8/1999 Kirksey .................. 434/169
6,185,538 B1 * 2/2001 Schulz .................. 704/278
6,226,443 B1 * 5/2001 Morioka et al. .............. 386/82
6,285,982 B1 * 9/2001 Imai et al. .................. 704/503

* cited by examiner

Primary Examiner—Richemond Dorvil
Assistant Examiner—Angela Armstrong
(74) Attorney, Agent, or Firm—Birch, Stewart, Kolasch & Birch, LLP

(57) ABSTRACT

The present invention relates to a method and apparatus for making it easy to understand the contents of sound during special reproduction. Herein, the MPEG multiple separation circuit separates digital data read out from the optical disk into audio data and video data, the sound recognition text conversion circuit converts audio data decoded in the MPEG audio decoder into text data by sound recognition, and the on-screen character processor generates video signals in which the characters representing text data are displayed, being overlapped with reproduced images. In case of special reproduction such as double-speed reproduction, the characters representing text data are displayed, being overlapped with special reproduced images.

3 Claims, 2 Drawing Sheets

SOUND SPECIAL REPRODUCING METHOD AND INFORMATION REPRODUCING APPARATUS

BACKGROUND OF THE INVENTION

1. Field of the Invention

The present invention relates to an information reproducing apparatus for reading data from a recording medium having audio data and video data, and more particularly, to a special reproducing method for specially reproducing sound and an information reproducing apparatus.

2. Description of the Background Art

Conventionally, in case of special reproduction, for example, double-speed reproduction, video tape recorders (VTR) or cassette tape recorders directly reproduce and output a sound with a frequency two times higher as compared to the normal reproduction.

In addition, as other special reproducing method, a method for thinning reproduced sound is known. In this method, for example, in case of quadruple-speed reproduction, three-quarters of reproduced audio data is cut, and one-quarter thereof is reproduced and outputted As seen from above, in the conventional special reproducing method of sound, in case of n-speed reproduction, reproduced sound frequency becomes n-times larger, or reproduced audio data becomes 1/n times smaller as compared to the normal reproduction, so that the omission of audio data becomes large. Thus, there occurs a problem that the contents of the audio data become unclear, and are hard to hear.

In addition, in an optical disk recording and reproducing apparatus for reading data from an optical disk, there is a problem that a method for specially reproducing sound is not established.

SUMMARY OF THE INVENTION

Accordingly, it is an object of the present invention to provide a special reproducing method of sound and an information reproducing apparatus capable of making it easy to understand the contents of sound during special reproduction.

In a special reproducing method of sound of the present invention, audio data read from a recording medium 1 is converted into text data by sound recognition during special reproduction, and the characters representing text data are displayed, being overlapped with special reproducing images.

In addition, in one embodiment of the above-described special reproducing method of sound, the contents of a sound for n-seconds recorded on the recording medium are displayed for one second during special reproduction, that is, n-speed reproduction (n is a positive real number larger than 1.)

In addition, in an information reproducing apparatus of the present invention, audio data read out from the recording medium 1 is converted into text data by sound recognition during special reproduction, and the characters representing the text data are displayed, being overlapped with special reproducing images displayed on a display device.

In addition, one embodiment of the above-described information reproducing apparatus includes: reading units 2 through 9 for reading out audio data and video data from a recording medium; display units 10 through 12 and 14 for displaying reproduced images based on video data on a display device; a conversion unit 13 for converting audio data by sound recognition and displaying the characters representing the text data, being overlapped with the reproduced images; and a control unit 15 for instructing the reading units, display units, and conversion units to perform a special reproduction according to a special reproduction request from the outside.

In addition, it is another object of the present invention to provide an information reproducing apparatus and method for converting at least parts of audio data read out from the recording medium into a visually recognizable form, and displaying them.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

Figure 1:
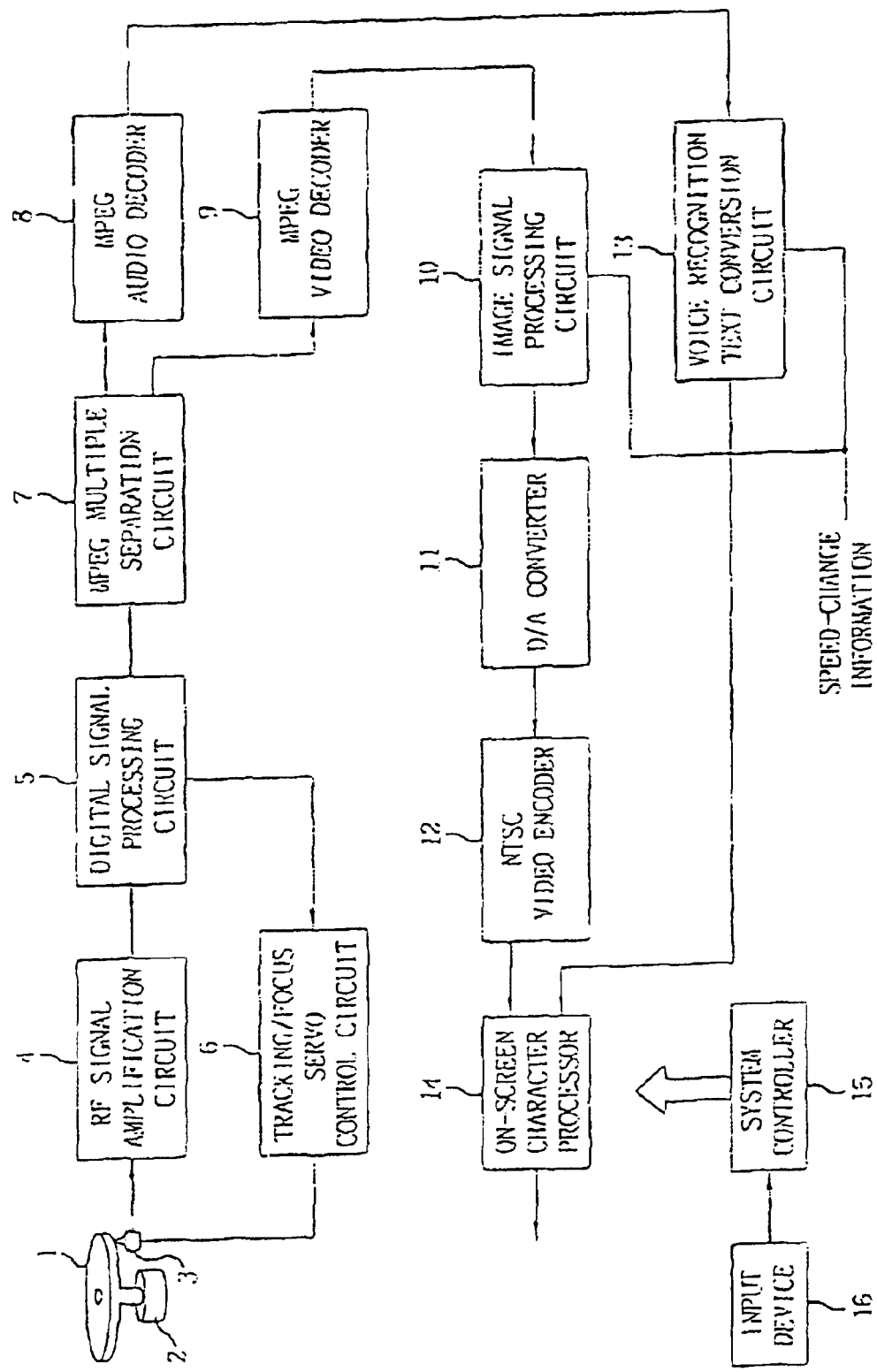
FIG. 1 is a block diagram showing one embodiment of an optical disk recording apparatus of the present invention.

The embodiment of the present invention will now be described with reference to the accompanying drawings. FIG. 1 is a block diagram of an optical disk recording and reproducing apparatus in accordance with the embodiment of the present invention.

The optical disk recording and reproducing apparatus of FIG. 1 includes an optical disk which is a recording medium having audio data and video data; a motor 2 for rotating the optical disk 1; an optical pickup 3 for reading out data recorded on the optical disk 1; a RF signal amplification circuit 4 for amplifying signals obtained from the optical pickup 3; a digital signal processing circuit 5 for demodulating the signals from the RF signal amplification circuit 4 and performing error correction; a tracking/focus servo control circuit 6 for positioning a laser spot irradiated from the optical pickup 3 to the optical disk 1 in a radial direction and in a vertical direction, a MPEG (Moving Picture Experts Group) multiple separation circuit 7 for separating digital data into audio data and video data; a MPEG audio decoder 8 for decoding audio data; a MPEG video decoder 9 for decoding video data, an image signal processing circuit 10 for performing a signal processing for special reproduction with respect to decoded video data; a D/A converter 11 for D/A converting video data outputted from the image signal processing circuit 10; a NTSC video encoder 12 for converting analog video signals into NTSC video signals; a sound recognition text conversion circuit 13 for converting decoded audio data into text data by sound recognition; an on-screen character processor 14 for generating video signals displayed by overlapping the characters representing text data with the NTSC reproduced images; a system controller 15 for controlling the entire optical disk recording and reproducing apparatus; and an input device for instructing the optical disk recording and reproducing apparatus by the user.

Next, the operation of the thusly constructed optical disk recording and reproducing apparatus during the normal reproduction will now be described in the system controller 15 of the optical disk recording and reproducing apparatus, when the optical disk 1 is loaded within the apparatus, the optical disk 1 is rotated by the motor 2.

The optical pickup 3 irradiates laser light for reproduction to the optical disk 1 according to the control of the system controller 15, and detects reflected light from the optical disk 1. In addition, the optical pickup 3 can move to the radial direction of the optical disk 1 by a driving unit (not shown) controlled by the system controller 15.

The signals obtained from the optical pickup 3 are amplified in the RF signal amplification circuit 4, and are inputted to the digital signal processing circuit 5.

Since the data recorded on the optical disk 1 is modulated in a modulation mode such as 8/16 modulation, and the digital signal processing circuit 5 demodulates signals inputted from the RF signal amplification circuit 4 and perform an error correction of the demodulated data.

In addition, the digital signal processing circuit 5 generates a laser spot irradiated to the optical disk 1 and a tracking error signal representing a position error in the disk radial direction of the optical disk 1, and at the same time generates a laser spot and a focus error signal representing a position error in the disk vertical direction of the optical disk 1 according to the signal inputted from the RF signal amplification circuit, for thereby outputting these signals to the tracking/focus servo control circuit 6.

The tracking/focus servo control circuit 6 positions the laser spot in the disk radial direction by driving the optical pickup 3, and at the same time in the disk vertical direction. Namely, the tracking/focus servo control circuit 6 makes the laser spot follow the track which is the target of the optical disk 1 according to the tracking error signal, and makes the laser spot to follow the recording layer which is the target of the optical disk 1 according to the focus error signal.

Next the MPEG multiple separation circuit 7 separates digital data (MPEG multiple stream in which audio packets and video packet are multiplied) outputted from the digital signal processing circuit 5 into audio data (MPEG audio stream in which audio packets are bound) and video data (MPEG video stream in which video packets are bound).

In this embodiment, the audio data and video data recorded on the optical disk 1 are coded in the MPEG method.

The MPEG audio decoder 8 demodulates the MPEG audio stream coded in the MPEG method.

Meanwhile, the MPEG video decoder 9 demodulates the MPEG audio stream coded in the MPEG mode. In case of 8 ucal pt, the image signal processing circuit 10 directly outputs a video data outputted from the MPEG video decoder 9.

Continuously, the D/A converter 11 converts the video data outputted from the image signal processing circuit 10 into video signals, and the NTSC video encoder 12 outputs the analog video signal into NTSC video signals.

In this way, the NTSC video signals are outputted to a display device (not shown) through the on-screen character processor 14, and reproduced images are thereby displayed an the screen of the display device.

Meanwhile, the sound recognition text conversion circuit 13 converts the audio data outputted from the MPEG audio decoder 8 into text data (character data).

Figure 2:
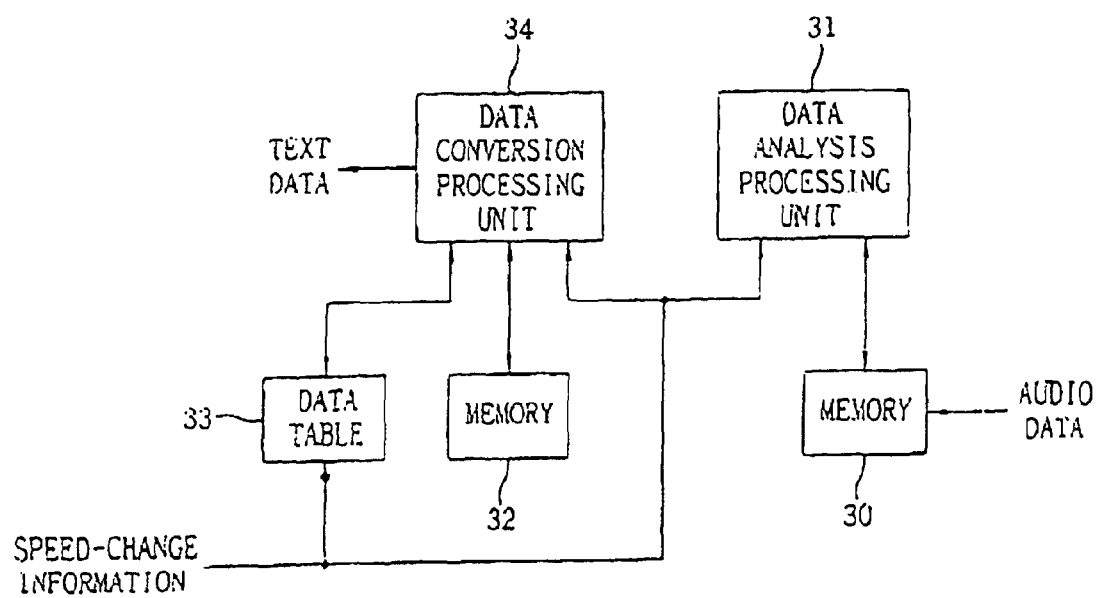
FIG. 2 is a block diagram of a sound recognition text conversion circuit.

FIG. 2 is a block diagram of the sound recognition text conversion circuit 13. The sound recognition text conversion circuit 13 includes a first memory 30, a data analysis processing unit 31, a second memory 32, a data table 33, and a data conversion processing unit 34.

The audio data outputted from the MPEG audio decoder 8 is once stored in the first memory 32.

Speed-change information representing how fast the optical disk 1 is reproduced is inputted from the system controller 15 into the data analysis processing unit 31, data table 33, and data conversion processing unit 34.

The data analysis processing unit 31 analyzes the audio data stored in the memory 30 according to the above speed-change information (in case of the normal reproduction performed at a single speed), and cuts the audio data with a frequency higher than 10 kHz. Continually, the data analysis processing unit 31 cuts the audio data less than −20 dB among the audio data stored in the memory 30 when the maximum sound volume is 0 dB.

The above process by the data analysis processing unit 31 is performed in order to improve the accuracy of sound recognition by suppressing unnecessary noise in the sound recognition.

The audio data processed by the data analysis processing unit 31 is sent to the data conversion processing unit 34, and is once stored in the second memory 32.

In the data table 33, text data and the corresponding audio data are registered. This registration is carried out for every characters (A, B, C, D, E . . . ).

The data conversion processing unit 34 integrates the timing of the audio data stored in the memory 32 with the timing of the audio data stored in the data table 33, and searches audio data nearest to the audio data stored in the memory 32 by comparing them. And, the data conversion processing unit 34 receives text data corresponding to the resultant data from the data table 33, and then outputs the same.

In this manner, the audio data outputted from the MPEG audio decoder 8 is converted into text data.

The on-screen character processor 14 generates video signals from the NTSC video encoder 12, and video signals in which the characters representing text data are overlapped with reproduced images, according to the text data from the sound recognition text conversion circuit 13.

Thusly, reproduced sound is displayed in the form of characters on the screen of the display device (not shown).

In the optical disk recording and reproducing apparatus above described, when the user requests special reproduction by operating the input device 16, the system controller 15 instructs each construction of the optical disk recording and reproducing apparatus to perform a special reproduction.

Due to this, special reproduced images are displayed on the screen of the display device (not shown), and at the same time the characters representing the contents of sound are displayed, being overlapped with the special reproduced images.

At this time, in case of n-speed reproduction (n is a positive real number larger than 1, e.g. 2-speed through 10-speed), the rotation speed of the motor 2 becomes n-times larger than as compared to the normal reproduction. Thus, the image signal processing circuit 10 processes video data so that the first one-second contents among the contents of images for n-seconds recorded on the optical disk 1 are extracted and the rest contents are removed, and outputs the same to the D/A converter 11.

In this way, the contents of images for n-seconds recorded on the optical disk 1 are displayed for one second.

In addition, in case of n-speed reproduction, the contents of sound for n-seconds recorded on the optical disk 1 are displayed for one second. Also, in this case, the operation of the sound recognition text conversion circuit 13 is performed in the same way as the normal reproduction. The data conversion processing 34 integrates the timing of the audio data stored in the memory 32 with the timing of the audio data stored in the data table 33, compares them, and then converts them into text data. Here, it is possible to reproduce the corresponding I-picture for a predetermined time according to the reproduction speed, and to convert the corresponding sound part into a visually recognizable form and display the same.

In addition, in this embodiment, although the NTSC standards is described as an example, the PAL standards are also possible. In case of the PAL standards, a PAL video encoder is prepared in place of the NTSC video encoder 12, and analog signals from the D/A converter 11 are converted into PAL video signals in this PAL video encoder.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

In accordance with the present invention, at least parts of the audio data read out from the recording medium during special reproduction are converted into a visually recognizable form, and are displayed being overlapped with special reproduced images, whereby it is possible to easily understand the contents of reproduced images that are hard to understand in the conventional method. In addition, when the present invention is applied to the optical disk recording apparatus, it is possible to implement the special reproducing method of sound in the optical reproducing apparatus.

What is claimed is:

1. A method for reproducing sound by using an information reproducing apparatus for reading out data from a recording medium having audio data and video data, comprising:

controlling a reproducing speed of the recording medium;

decoding audio data and video data;

performing a signal processing for n-speed producing, where n is a positive real number greater than 1, with respect to decoded video data;

converting decoded audio data into text data by sound recognition, comprising:

analyzing the audio data according to speed change information from the system controller;

registering the text data and the corresponding audio data;

integrating the timing of the decoded audio data with the timing of the registered audio data;

searching the registered audio data nearest to the decoded audio data; and receiving the text data corresponding to the decoded audio data; and generating video signals displayed by superimposing the characters representing the text data with the specially reproduced images, wherein contents of the sound which are recorded on the recording medium for n seconds are displayed during 1 second of the specially reproduced images.

2. An information reproducing apparatus for reading out data from a recording medium having audio data and video data, comprising:

conversion means for converting the audio data into text data by sound recognition, and displaying the characters representing text data, being overlapped with the reproduced images, wherein the conversion means comprises:

data analysis processing means for analyzing the audio data according to speed change information and for improving the accuracy of sound recognition by suppressing unnecessary noise;

registering means for registering the text data and the corresponding audio data; and data conversion processing means for integrating the timing of the audio data from the data analysis processing means with the timing of the audio data from the registering means, and searching audio data from the registering means nearest to the audio data from the data analysis processing means by comparing each audio data and receiving the text data corresponding to the audio data from the registering means, wherein the characters representing text data are displayed superimposed on specially reproduced images displayed in a display device, wherein contents of the sound which are recorded on the recording medium for n seconds are displayed during 1 second of the specially reproduced images.

3. An information reproducing apparatus for reading out data from a recording medium having audio data and video data, comprising:

a system controller for controlling a reproducing speed of the recording medium;

MPEG audio and video decoders for decoding audio data and video data;

an image signal processing circuit for performing a signal processing for n-speed producing, where n is a positive real number greater than 1, with respect to decoded video data;

a sound recognition text conversion circuit for converting decoded audio data into text data by sound recognition, wherein the sound recognition text conversion circuit comprises:

a data analysis processing unit for analyzing the audio data according to speed change information from the system controller and for improving the accuracy of sound recognition by suppressing unnecessary noise;

a data table for registering the text data and the corresponding audio data; and a data conversion processing unit for integrating the timing of the audio data from the data analysis processing unit with the timing of the audio data from the data table, and searching audio data from the data table nearest to the audio data from the data analysis processing unit by comparing each audio data and receiving the text data corresponding to the audio data from the data table; and an on-screen character processor for generating video signals displayed by superimposing the characters representing text data with the NTSC reproduced images, wherein, during special reproduction performed at n-speed, the contents of audio data for n-seconds recorded on the recording medium are displayed for 1 second.

* * * * *